United States Patent [19]

Gventer et al.

[11] Patent Number: 4,764,213

[45] Date of Patent: Aug. 16, 1988

[54] LITHOGRAPHIC FOUNTAIN SOLUTION CONTAINING MIXED COLLOIDS

[75] Inventors: Henry Gventer, Florham Park; Raymond Hamilton, Piscataway, both of N.J.

[73] Assignee: Hoechst Celanese Corporation, Somerville, N.J.

[21] Appl. No.: 874,942

[22] Filed: Jun. 16, 1986

[51] Int. Cl.$^4$ .................................................. C09K 3/00

[52] U.S. Cl. .......................................... 106/2; 106/25; 524/55; 524/502; 524/548

[58] Field of Search ............... 106/2, 25; 524/55, 502, 524/548

[56] References Cited

U.S. PATENT DOCUMENTS

| | | | |
|---|---|---|---|
| 3,108,535 | 10/1963 | Uhlig | 101/149.2 |
| 3,289,577 | 12/1966 | Uhlig | 101/149.2 |
| 3,627,685 | 8/1969 | Lam | 252/100 |
| 4,253,999 | 3/1981 | Okishi | 101/465 |
| 4,266,481 | 5/1981 | Garrett et al. | 101/456 |
| 4,348,954 | 9/1982 | Okishi | 101/465 |
| 4,396,703 | 8/1983 | Matsumoto et al. | 430/302 |
| 4,399,243 | 8/1983 | Dixit et al. | 524/55 |
| 4,400,481 | 8/1983 | Dixit et al. | 524/55 |
| 4,401,739 | 8/1983 | Senga et al. | 430/16 |
| 4,475,460 | 10/1984 | Matsumoto | 101/465 |
| 4,606,985 | 8/1986 | Takaya et al. | 430/14 |

*Primary Examiner*—Amelia Burgess Yarbrough
*Attorney, Agent, or Firm*—John P. Blasko; Michael J. Tully

[57] ABSTRACT

A lithographic fountain solution concentrate is disclosed, the essential components of which comprises an aqueous mixture of:

(a) from about 0.1 to 1.5 percent by weight of a water soluble film forming hydrophilic gum;

(b) from about 0.75 to about 8.5 percent by weight of Polyvinyl Pyrrolidone;

(c) from about 5.0 to about 30.0 percent by weight of a water soluble acid etchant;

(d) from about 20.0 to about 50.0 percent by weight of a water soluble or water miscible glycol; and (e) from about 0.01 to about 1.25 percent by weight of a phosphate/phosphoric acid buffer system.

The concentrate is adapted for further dilution by water to yield a fountain solution which when used in the printing process offers decreased scumming and blinding of printing plates while at the same time permitting a reduction in the amount of water applied to the plate. Improved print quality, reduced tendency to wet the paper, faster ink drying and improved ink/water balance is thereby achieved.

10 Claims, No Drawings

LITHOGRAPHIC FOUNTAIN SOLUTION CONTAINING MIXED COLLOIDS

BACKGROUND OF THE INVENTION

This invention relates to an acidic aqueous fountain etch concentrate solutions useful for lithographic printing. Lithographic printing is a well known and established art. In general, the process involves printing from a flat plate or cylinder, usually anodized aluminum, having substantially no surface relief and depends upon different properties of the image and non-image areas of the surface for printability. In lithography, the image to be reproduced is imparted to the plate by any one of several methods well known to those skilled in the art in such a way that the non-image areas are rendered hydrophilic while the image areas are hydrophobic. A widely practiced technique employs a photosensitive coating for this purpose. Following exposure of the photosensitive coating to imagewise modulated light, the latent image is developed and a portion of the coating is removed from the plate. Next, the plate is treated with a desensitizing solution (so called finisher or preserver composition) to render the plate hydrophilic in the areas from which the photosensitive coating has been removed. During the actual printing process, an aqueous fountain solution is applied to the plate surface. The fountain solution keeps moist all portions of the surface not covered by the hydrophobic image. Furthermore, the fountain solution prevents the plate from scumming, i.e., it prevents the non-image areas from becoming at least partially ink receptive. The fountain solution may be formulated to gradually etch the surface of the plate just enough to keep the lines sharp and prevent rapid wear. In a conventional system, the fountain solution is applied to the plate by one or more rollers. At least one ink roller coated with an oil based printing ink then contacts the entire surface of the plate but deposits the lithographic ink only on the image area since the hydrophilic non-image areas repel the ink. Hence, for each impression made during a run, the lithographic plate is first dampened with the aqueous fountain solution and then inked with a lithographic ink. Alternatively, the fountain solution and at least a portion of the oil based ink are applied to the plate simultaneously with a form roller. In this latter system, other rollers, usually smaller in diameter than the first, may contact the plate subsequently to distribute the ink more evenly. Finally, the ink on the image is transferred directly to a paper sheet or other receptive surface to be printed, or to an offset blanket of rubber or synthetic material which in turn transfers the print to the final copy surface.

Fountain solutions may be made up by the printer from a fountain etch concentrate by adding additional water and optionally about 10 to 30 percent by volume of isopropyl alcohol. Aqueous acidic fountain etch concentrates of the prior are generally contain a water soluble resin or gum such as gum arabic or cellulose gum and may also contain an etching agent, buffering agents and wetting agents.

Acidic fountain solutions are generally formulated to achieve a variety of functions. Hydrophilic colloids such as gum arabic are employed to keep the non-image areas of the plate hydrophilic during the press run. Acid etchants may also be included to keep the non-imaged areas more sharply defined and ink repellent. Surfactants or combinations of surfactants and alcohols such as isopropyl alcohol are used to lower the surface tension of the solution to permit enhanced wetting of the plate and roller surfaces. This characteristic may be also achieved without using surfactants by using amounts of hydrophilic colloids in excess of that required to maintain hydrophilicity of non-image plate surfaces in combination with one or more metal salts such as nitrates, chromates and the like, and/or alcohols or glycols.

The use of surfactants in such compositions can lead to problems such as foaming or emulsification of the printing ink during the press run. Fountain solutions containing surfactants also tend to wet the paper being printed more than solutions without surfactants, particularly in color applications. This causes the paper to become spongelike and the printing ink to diffuse somewhat on the paper, leading to less than sharp images. The use of higher than necessary levels of colloid can lead to scumming or blinding of the plate and can also enhance the tendency of the printing ink to emulsify. The use of salts such as nitrates with excessive colloid (gum arabic) can further complicate the blinding problem due to the tendency of these materials to complex with gum arabic yielding gum arabic salts which usually cause plate blinding. The use of significant quantities of alcohols such as isopropyl alcohol in fountain solutions tends to reduce the solubility of other components present in the solution which can then build up on roller or plate surfaces as they leave solution. In addition, isopropyl alcohol is undesireable because it is toxic, flammable, and has a low vapor pressure which leads to rapid evaporation.

Variations in such formulations have been disclosed in the prior art. For example, U.S. Pat. No. 4,266,481 teaches the replacement of gum arabic in fountain solutions with a composition comprising a polyacrylamide polymer to avoid, inter alia, the tendency of gum arabic based fountain solutions to emulsify the ink used in the lithographic process, thereby weakening the printing resolution and contributing to scumming of the plate and stripping of the ink from the ink rollers. The tendency of gum arabic to lead to plate blinding (a condition where it deposits onto the image bearing surface of the plate rendering it partially hydrophilic) is recognized by U.S. Pat. No. 4,400,481 in aqueous based plate finisher and preserver compositions. The patent teaches that this problem can be avoided in such formulations by utilizing a three component mixture comprising gum arabic, polyvinylpyrrolidone and polyacrylamide. However finisher compositions as disclosed in this patent would not be easily adapted for use in a fountain solution because of a tendency to cause ink emulsification and transfer problems and excess buildup of solids on lithographic dampening roller systems.

There is a persistent demand, for improved fountain solutions for offset printing which not only minimize scumming or blinding of the printing plates, but also offer other advantages such as uniform pH control, resistance to buildup of solution residues on transfer rolls or roll covers, improved print quality, reduced tendency to wet the printing paper, faster ink drying and improved ink/water balance.

SUMMARY OF THE INVENTION

These and other objectives may be achieved by providing a fountain solution concentrate, the essential components of which comprise an aqueous mixture of:

(a) from about 0.1 to about 1.5 percent by weight of a water soluble film forming hydrophilic gum;
(b) from about 0.75 to about 8.5 percent by weight of Polyvinyl Pyrrolidone;
(c) from about 5.0 to about 30.0 percent by weight of a water soluble acid etchant;
(d) from about 20.0 to about 50.0 percent by weight of a water soluble or water miscible glycol; and
(e) from about 0.01 to about 1.25 percent by weight of a phosphate/phosphoric acid buffer system.

The above concentrate may be formulated to contain about 12 to 60% by weight water and is adapted for further dilution by the user with water or a mixture of water and less than 10% by volume of isopropyl alcohol to yield fountain solutions containing at least about 99% by weight of water or water/alcohol mixture, preferably about 99.1% to 99.9% by weight and correspondingly about 0.1 to about 0.9% by weight of non-aqueous/non-alcohol components. The composition of the concentrate or the solution may be further characterized by the language "consisting essentially of" by which is meant that the solution is functional as described while free of any significant amount of surfactant or nitrate or chromate salts as etchants.

The fountain solutions of the present invention may be characterized as having a surface tension (as measured by a Surface Tensiometer) within the range of about 30 to 40 dynes per $cm^2$ which is achieved without the necessity of inclusion of high levels of gum arabic, or of surfactants and/or nitrate salts in the composition. They are of generally low solids content and can be applied to printing plates at generally lower levels than prior art solutions while still achieving the function of a quality fountain solution, i.e., to appropriately wet and prevent scumming or blinding of the printing plate. This in turn means that the plate wets the printing paper to a lesser extent and less solids tend to build up on the plate itself or on the molleton rollers which apply the solution.

DETAILED DESCRIPTION OF THE INVENTION

Water soluble film forming hydrophilic gums which may be employed in this invention include gum arabic, gum tragacanth, carboxymethylcellulose, sodium alginate, carboxymethyl-starch, methylcellulose and similar gums which impart hydrophilic properties when applied to non-image areas of the lithographic plate. The preferred species for the purposes of this invention is gum arabic, and the preferred gum content in the concentrate is from about 0.1 to about 1.5 percent by weight.

The second hydrophilic film forming component of the fountain solution is polyvinyl pyrrolidone, which is present in the concentrate within the range of about 0.75 to about 8.5 percent by weight.

The respective ratio of polyvinyl pyrrolidone to gum present in the composition is important to achieve the advantages of minimization of plate blinding or scumming and at the same time permitting the application of minimum amounts of water to the printing plate during the printing run. It has been found that best results are achieved when the ratio of polyvinylpyrrolidone to gum on a dry weight basis is at least 1 to 1. The more preferred ratio of these components is from about 10 to 1 to about 4 to 1 respectively with 8 to 1 to 6 to 1 being most preferred.

The acid etchant component of the fountain solution serves the dual function of pH control and plate etchant. Preferred acids are water soluble weak acids such as citric, ascorbic, sulfanilic, tartaric, lactic, acetic, maleic and phosphoric acids, although dilute sulfuric acid may also be employed. The preferred acid is citric acid. The acid is employed at a level to impart a pH to the concentrate in the range of about 2 to about 3.5 which when further diluted with water for use as a fountain solution will yield a pH in the range of about 4 to about 4.5. The acid is used at a level of from about 5.0 to about 30.0 percent by weight based on the aqueous concentrate, with 10 to 25% by weight being the preferred range.

The fourth component of the fountain solution is a water soluble or water miscible glycol which serves as a wetting agent to facilitate the spread of water over the non-image area of the plate surface and also to retard the transfer of printing ink to the roll surface (molleton covers) of the rollers used to apply the fountain solution. Suitable glycols which may be employed are alkane diols having about 2 to 6 carbon atoms in the backbone chain such as ethylene glycol, butane diol, hexanediol, propylene glycol, neopentyl glycol as well as alkyl substituted diols such as 2-ethyl-1,3 hexanediol. The concentrate may contain from about 20 to 50 percent by weight of the glycol, with 30 to 45 percent by weight being the preferred range. Ethylene glycol is the preferred glycol.

The fifth component of the fountain solution is a phosphate/phosphoric acid buffering system which enhances the stability of the composition and appears to act synergistically with the polyvinyl pyrrolidone component to insure a constant pH of the fountain solution, independent of dilution or water source. The phosphate component may comprise one or mixtures of mono, di, or tri sodium phosphate in combination with phosphoric acid, and preferably at a ratio of about 10 to 2 parts by weight of phosphate per one part by weight phosphoric acid.

The concentrate may also contain a bactericide such as Dowicil® 75 of the Dow Chemical Company used at a level to prevent or retard bacteria, generally about 0.01 to 0.4% by weight of the concentrate, more preferably at a level of about 0.05 to 0.125% by weight. Other inert ingredients such as an indicator dye may also be present in the concentrate.

The above ingredients are formulated into a concentrate by dissolving them in water, preferably demineralized water. The concentrate preferably contains from about 40 to 85% by weight water soluble and water miscible components dissolved in water, with 50 to 75% by weight being the preferred level of such components.

A press ready fountain solution may be prepared by the printer by adding about 25 to 90 grams of the above concentrate to 4 liters of water (about 1 to 3 ounces per gallon of water). The most preferable dilution by the user is 1 1/2 to 2 ounces of concentrate (about 40 to 60 grams) per 3.75 liters of water (per gallon). If desired, up to about 10% by volume of the water may be replaced by isopropyl alcohol to further enhance the wetting characteristics of the solution.

A particular advantage of the fountain solution of the present invention is that certain additives present in conventional fountain solutions are not required to achieve good ink/water balance and anti-plate blinding-/anti-plate scumming properties when used in the printing operation. For example, conventional etchants such as nitrates and chromates are not required and therefore there is less tendency for solids build-up on the lithographic rollers during printing caused by precipitation out of solution of these materials. This is not to say that less than conventional amounts of these materials can not be included in the formulation if desired.

Similarly, good surface tension and wetting properties of the solution may be achieved without the inclusion of isopropyl alcohol when the fountain concentrate is diluted prior to use in the printing process. It may be desirable, however, in some cases to include minor amounts of less than 10% by volume of isopropyl alcohol to further enhance surface properties of the solution.

The following Examples are illustrative of the invention.

EXAMPLE 1

0.5 parts by weight of phosphoric acid (85%) is added to 40.0 parts by weight of demineralized water with constant agitation in a laboratory beaker. 10.5 parts by weight of gum arabic powder and 2.5 parts of disodium phosphate are then added. The solution is heated to 65° C. for 30 minutes under continuous agitation.

After the 30 minute heating time, the heat is discontinued and 46.5 parts by weight of demineralized water are added. This is done with continuous mixing which is maintained throughout the remainder of the procedure. 4.8 parts of this solution prepared as described are then added to the following ingredients with no particular significance taken as to rate or interval:

| | |
|---|---|
| polyvinyl pyrrolidone (K-15) | 3.8 parts by weight |
| citric acid | 19.0 parts by weight |
| demineralized water | 34.3 parts by weight |
| ethylene glycol | 38.1 parts by weight |

The mixture is allowed to stir until all ingredients are dissolved. The solution is cooled to room temperature and referred to as the concentrate fountain solution.

EXAMPLE 2

A fountain solution is prepared by mixing 8.75 ounces of the concentrate of Example 1 with five gallons of demineralized water. This solution is added to one fountain sump of a Miller TP 29S 2 color press (Solution A). In like manner, a commercially available fountain concentrate intended for use on sheet-feed presses is provided. This concentrate is characterized as a gum arabic based solution comprised of salts and surfactants. 8.75 ounces of concentrate are added to a mixture of water and isopropanol wherein isopropanol is present in the amount of 25%, volumetrically. This solution is added to the other sump of the press (Solution B). Each sump is independently operated, controlled and delivered to a separate printing unit. The two color press prints two colors in tandem on each sheet of paper delivered.

The ink and fountain metering are independently adjusted. Two N-50 plates are properly exposed, developed and finished. N-50s are slurry grained anodized negative working plates produced by Enco Printing Products, a division of American Hoechst Corp., Somerville, N.J. Both prepared N-50 plates are correctly mounted on the two plate cylinders. Using Mead Offset Enamelled Stock, the printing process begins by setting both fountain delivery systems to 36. The ink is adjusted to give a wet ink density of 1.35. When the ink balance is achieved, the fountain setting is reduced by a setting of two. This is continued until the printed sheet shows evidence of toning. This is evidence of unacceptable print quality. However, it is desirable to reduce the fountain setting as low as possible to minimize the amount of water transported. The greater the amount of water given to the paper, the greater the chance of paper wetting and consequently print distortion. Also, additional amounts of water mixed into the ink can cause ink emulsification and/or roll stripping, both of which produce poor print quality.

The N-50 being run with the commercial fountain solution (Solution B) begins to tone at a setting of 30. The plate run with the fountain solution of this invention (Solution A) does not tone until a setting of 22-24. The water settings are returned to the starting point and the test is repeated several times. The plate running with the commercial fountain solution (Solution B) is not able to recover after the third tone cycle. The plate running with the fountain solution of this invention (Solution A) is still printing clean after the fourth cycle.

Fresh plates are prepared and run at a setting of 32. The press is shut down for one hour. After this holdover period, the plate run is begun again. The plate having been used with the commercial fountain solution (Solution B) prints a dark scum which will not be removed with increased fountain delivery. It must be cleaned with a plate cleaner before acceptable quality copies are obtained.

The plate used with the fountain solution of this invention (Solution A) rolls up clean and yields quality copies within less than 10 impressions.

From the above it is readily seen that the fountain solution of this invention is able to print clean with a lower fountain setting, thereby providing a desired ink/water balance. Also, the hydrophilyzing of the plate background during holdover is better, thereby allowing for better and easier rollup.

EXAMPLE 3

In like manner as described in Example 2, all tests are repeated except that a second commercially available fountain solution is substituted for the one use in Example 2. This fountain solution is particularly well suited for sheet-fed presses. It is characterized as a gum arabic based solution comprised of salts, surfactants and an alcohol substitute. 6.25 ounces of the fountain solution concentrate are added to a five gallon mixture of isopropanol and water wherein the isopropanol is present in the amount of 20% by volume. The settings are reduced until toning occurs. It is found that this commercial fountain solution also tones at 30 whereas the fountain solution of this invention does not tone until 22-24.

The holdover is similarly found to be identical to that described in Example 2.

EXAMPLE 4

In like manner as described in Example 2, the evaluation is performed except that N-250 plates are substituted for N-50 plates. N-250 plates are electrochemically grained anodized negative working plates produced by Enco Printing Products, a division of American Hoechst Corp., Somerville, N.J.

In this instance the plate using the commercial fountain solution is observed to tone at a setting of 28 whereas the plate using the fountain solution of this invention tones at a setting of 20.

The holdover characteristics are found to be identical to those described in Example 2.

EXAMPLE 5

This example illustrates press results obtained using a fountain solution prepared according to Example 1 except that the polyvinyl pyrrolidone is eliminated.

A fountain concentrate is prepared as set forth in Example 1, except that polyvinyl pyrrolidone is eliminated. All other ingredients, and ratios thereof, remain the same. The concentrate is diluted as set forth in Example 2 and added to the first sump of the press (Solution C). The commercial fountain solution used in Example 2 is added to the other sump (Solution B).

The N-50 being run with the commercial fountain solution (Solution B) begins to tone at a setting of 30. The fountain solution without the polyvinyl pyrrolidone (Solution C) tones at a setting of 30. The water settings are returned to the starting point and the test is repeated several times. Plates running with each fountain solution are not able to recover after the third tone cycle.

Fresh plates are prepared and run at a setting of 32. The Press is shut down for one hour. After this holdover period, the unpreserved and uncleaned plates are begun again. Both plates print a dark scum. The plate used with the commercial fountain solution (Solution B) will not have the scum removed with increased fountain delivery. The plate used with Solution C cleans somewhat but insufficient to be considered acceptable. Both must be cleaned with a plate cleaner before acceptable quality copies are obtained.

EXAMPLE 6

This example illustrates press results obtained using a fountain solution prepared according to Example 1 except that gum arabic is eliminated.

A fountain concentrate is prepared as set forth in Example 1 except that gum arabic is eliminated. All other ingredients, and ratios thereof, remain the same. The concentrate is diluted as set forth in Example 2 and added to the first sump of the press (Solution D). The commercial fountain solution used in Example 2 is added to the other sump (Solution B).

The N-50 being run with the commercial fountain solution (Solution B) begins to tone at a setting of 30. The fountain solution without the gum arabic (Solution D) tones at a setting of 30. The water settings are returned to the starting point and the test is repeated several times. The plate running with the commercial fountain solution is not able to recover after the third tone cycle. The plate running with Solution D is not able to recover after the fourth tone cycle.

Fresh plates are prepared and run at a setting of 32. The press is shut down for one hour. After this holdover period, the unpreserved and uncleaned plates are run again. Both plates print a dark scum. The plate used with the commercial fountain solution (Solution B) will not have the scum removed with increased fountain delivery. The plate used with Solution D cleans somewhat but insufficient to be considered acceptable. Both must be cleaned with a plate cleaner before acceptable quality copies are obtained.

What we claim is:

1. In an offset printing process, the improvement which comprises dampening a printing plate with a fountain solution comprising a mixture of the following non-aqueous components:

(a) from about 0.1 to about 1.5 percent by weight of a water soluble film forming hydrophilic gum;

(b) from about 0.75 to about 8.5 percent by weight of polyvinyl pyrrolidone;

(c) from about 5 to about 30 percent by weight of an acid etchant;

(d) from about 20 to about 50 percent by weight of a water soluble or water miscible glycol; and (e) from about 0.01 to about 1.25 percent by weight of a phosphate/phosphoric acid buffer system;

said mixture being mixed with sufficient water such that the amount of non-aqueous components present in the solution is in the range of about 0.1 to about 0.9 percent by weight.

2. The process of claim 1 wherein the ratio of polyvinyl pyrrolidone to gum is within the range of about 10 to 1 to 4 to 1 respectively on a dry weight basis.

3. The process of claim 2 wherein said hydrophilic gum is gum arabic.

4. The process of claim 2 wherein said glycol is ethylene glycol.

5. The process of claim 4 wherein said ethylene glycol is present at a level of from about 30 to about 45 percent by weight.

6. The process of claim 2 wherein said acid etchant is selected from the group consisting of citric, ascorbic, sulfanilic, tartaric, lactic, maleic, phosphoric, acetic and dilute sulfuric acids.

7. The process of claim 6 wherein said acid etchant is present at a level of from about 10 to about 25 percent by weight.

8. The process of claim 6 wherein said acid etchant is citric acid.

9. In an offset printing process, the impovement which comprises dampening a printing plate with a fountain solution consisting essentially of a mixture of the following non-aqueous components:

(a) from about 0.1 to about 1.5 percent by weight of gum arabic;

(b) from about 0.75 to about 8.5 percent by weight of polyvinyl pyrrolidone;

(c) from about 5 to about 30 percent by weight of citric acid;

(d) from about 20 to about 50 percent by weight of ethylene glycol; and (e) from about 0.01 to about 1.25 percent by weight of a phosphate/phosphoric acid buffer system;

said mixture being mixed with sufficient water such that the amount of non-aqueous components present in the solution is in the range of about 0.1 to about 0.9 percent by weight.

10. The process of claim 9 wherein the ratio of polyvinyl pyrrolidone to gum arabic is within the range of about 10 to 1 to about 4 to 1 respectively on a dry weight basis.

* * * * *